(12) United States Patent
Huber et al.

(10) Patent No.: US 11,002,519 B2
(45) Date of Patent: May 11, 2021

(54) INTERFACE BRIDGE FOR INITIALIZING A WEAPON WITH MISSION PLANNING DATA

(71) Applicant: Raytheon Company, Waltham, MA (US)

(72) Inventors: Charles F. Huber, Waltham, MA (US); Bradley Bomar Hammel, Waltham, MA (US)

(73) Assignee: Raytheon Company, Waltham, MA (US)

(*) Notice: Subject to any disclaimer, the term of this patent is extended or adjusted under 35 U.S.C. 154(b) by 0 days.

(21) Appl. No.: 16/581,703

(22) Filed: Sep. 24, 2019

(65) Prior Publication Data
US 2021/0095945 A1   Apr. 1, 2021

Related U.S. Application Data

(62) Division of application No. 14/034,347, filed on Sep. 23, 2013, now Pat. No. 10,422,615.

(51) Int. Cl.
*F41H 11/02* (2006.01)
*F41H 11/00* (2006.01)

(52) U.S. Cl.
CPC .................................. *F41H 11/00* (2013.01)

(58) Field of Classification Search
None
See application file for complete search history.

(56) References Cited

U.S. PATENT DOCUMENTS

| | | |
|---|---|---|
| 5,229,538 A | 7/1993 | McGlynn et al. |
| 6,122,569 A | 9/2000 | Ebert et al. |
| 6,212,224 B1 | 4/2001 | Cammarota et al. |
| 6,535,522 B1 | 3/2003 | Arato et al. |
| 6,615,116 B2 | 9/2003 | Ebert et al. |
| 6,831,926 B1 | 12/2004 | Kinstler |
| 6,941,850 B1 | 9/2005 | McMahon |
| 7,136,393 B2 | 11/2006 | Owens et al. |
| 7,453,904 B2 | 11/2008 | Seto |
| 7,802,048 B2 | 9/2010 | Campbell |
| 8,516,938 B2 | 8/2013 | Roemerman et al. |
| 2003/0018840 A1 | 1/2003 | Chandler et al. |
| 2003/0033059 A1 | 2/2003 | Ebert et al. |
| 2004/0205285 A1 | 10/2004 | Kinstler |
| 2005/0183570 A1 | 8/2005 | McMahon |
| 2010/0070674 A1 | 3/2010 | Campbell |

(Continued)

OTHER PUBLICATIONS

AN-6140, High Speed 10 Mb/sec Buses Derived From MIL-STD-1553, Aug. 2013, 10 pages, Holt Integrated Circuits, Inc.

(Continued)

*Primary Examiner* — Reginald S Tillman, Jr.

(57) ABSTRACT

A military standard-1760 (MIL-STD-1760) interface bridge for storing mission planning data can include a housing, a translator device, a ground support equipment (GSE) connector, and non-volatile memory. The housing can include a MIL-STD-1760 connector on a first end and a weapon side connector on a second end. The translator device can translate a MIL-STD-1553 remote terminal (RT) protocol to a weapon side signaling protocol and translate the weapon side signaling protocol to the MIL-STD-1553 RT protocol. The GSE connector can be coupled to the housing and translator device for downloading mission planning data for a weapon. The non-volatile memory can be configured to store the mission planning data.

15 Claims, 10 Drawing Sheets

(56) References Cited

U.S. PATENT DOCUMENTS

| | | | |
|---|---|---|---|
| 2010/0217899 | A1 | 8/2010 | Sitzmann et al. |
| 2012/0150365 | A1 | 6/2012 | Maxwell et al. |
| 2013/0218372 | A1 | 8/2013 | Wolfanger et al. |
| 2015/0089099 | A1 | 3/2015 | Huber et al. |

OTHER PUBLICATIONS

Cobham, BRU-61/A Small Diameter Bomb Carriage System, 2009, pp. 2, 900-071-0209, Carleton Technologies Inc, Orchard Park, New York.

Data Device Corporation, MIL-STD-1553 Today and Into the Future, Long Island Section, Instrumentation & Measurement Society, Nov. 13, 2008, 43 pages, IEEE, Piscataway, NJ.

Department of Defense, Interface Standard for Aircraft/Store Electrical Interconnection System, Aug. 1, 2003, 187 pages.

DOT&E, Joint Direct Attack Munition (JDAM), Annual Report, 1999, 4 pages.

FAS, AAGM-154A Joint Standoff Weapon (JSOW), http://www.fas.org/man/dod-101/sys/smart/agm-154.htm, Jun. 2000, 3 pages.

Gregory, Aircraft, Launcher & Weapon Interoperability Common Interfaces, North Atlantic Treaty Organization, Jan. 2007, 37 pages.

Huber et al, Advanced UAI Integration Tools for Air to Ground Weapon Integration, SAE International, Paper No. 2012-01-2136, Oct. 2012, 3 pages.

Kopp, Texas Instruments (Raytheon) AGM-88 HARM, Air Power International, Dec. 1998, vol. 4, No. 1, 19 pages.

Lockheed Martin, Lockheed Martin Completes JASSM F-15E Integration with Successful All-Up Round Flight Test, Jul. 26, 2012, 2 pages, Orlando, Florida.

Raytheon, Paveway: Laser and GPS/Laser Precision Guided Bombs, 2006, 2 pages, Waltham, Massachusetts.

Wikipedia, MIL-STD-1553, http://en.wikipedia.org/wiki/MIL-STD-1553, as accessed on Mar. 4, 2016, 8 pages.

Wikipedia, MIL-STD-1760, Sep. 10, 2012, 3 pages.

Wikipedia, MIL-STD-1760, http://en.wikipedia.org/wiki/MIL-STD-1760, as accessed on Mar. 4, 2016, 4 pages.

| Value (hex) | Field/Data Element Name | Size | Description | Byte/sect |
|---|---|---|---|---|
| * = example proposed data type | | | | |
| 8008 | MISSION PLAN | 2 | Class Code - mission plan module | 8154 |
| 00001428 | MODULE SIZE | 4 | Header - Module Size | |
| 00000000 | HEADER CONTENTS | 4 | Header - Contents (SINGLE; no optional header fields) | |
| 0002 | USER | 2 | Header - User Code - JSOW-C | |
| 0007 | ELEMENT COUNT | 2 | Header - Module Element Count | |
| 8007 | CLASS CODE | 2 | Target data module | |
| 800F * | CLASS CODE | 2 | Launch data module | |
| 8005 | CLASS CODE | 2 | Navigation/route module | 460 |
| 8004 | CLASS CODE | 2 | Aimpoint/Terminal guidance/profile module | |
| 8011 * | CLASS CODE | 2 | Seeker data module | |
| 8003 | CLASS CODE | 2 | Warhead/fuzing module | |
| 8012 * | CLASS CODE | 2 | Seeker reference module | |

| 8007 | TARGET DATA | 2 | Class Code - Target data module | 52 |
|---|---|---|---|---|
| 00000038 | MODULE SIZE | 4 | Header - Module Size | |
| 00000000 | HEADER CONTENTS | 4 | Header - Contents (SINGLE; no optional header fields) | |
| 0002 | USER | 2 | Header - User Code - JSOW-C | |
| 0004 | ELEMENT COUNT | 2 | Header - Module Element Count | |
| 0136 | CLASS CODE | 2 | Target Type and Coordinate Frame | |
| 022F | CLASS CODE | 2 | Mission Number | |
| 0218 | CLASS CODE | 2 | Target 3D Coordinate | 462 |
| 0203 | CLASS CODE | 2 | Aimpoint Offset from reference, NED coordinates | |
| (data) | PACKED BYTES | 2 | Target Type and Coordinate Frame | |
| (data) | IDENT MISSION NUMBER | 2 | Mission Number | |
| (data) | TARGET 3D CORD | 12 | Target 3D Coordinate | |
| (data) | AIMPOINT REL NED | 12 | Aimpoint Offset from reference, NED coordinates | |

| 800F * | LAUNCH | 2 | Class Code - Launch data module | 78 |
|---|---|---|---|---|
| 0000004E | MODULE SIZE | 4 | Header - Module Size | |
| 0000 | HEADER CONTENTS | 4 | Header - Contents (SINGLE; no optional header fields) | |
| 0002 | USER | 2 | Header - User Code - JSOW-C | |
| 0007 | ELEMENT COUNT | 2 | Header - Module Element Count | |
| 0231 * | CLASS CODE | 2 | Nominal Launch Point/Vector | |
| 003C | CLASS CODE | 2 | Platform Pitch at Launch | |
| 003D | CLASS CODE | 2 | Platform Roll at Launch | |
| 0233 * | CLASS CODE | 2 | LAR Wedge | 464 |
| 0140 * | CLASS CODE | 2 | Preplanned Time to Video | |
| 0140 * | CLASS CODE | 2 | Preplanned Target View Time | |
| 0140 * | CLASS CODE | 2 | Time of Flight | |
| (data) | NAV POSN-HVEL * | 16 | Nominal Launch Point/Vector | |
| (data) | XFER ALIGN PLTFM PITCH | 2 | Platform Pitch at Launch | |
| (data) | XFER ALIGN PLTFM ROLL | 2 | Platform Roll at Launch | |
| (data) | NAV LAR WEDGE | 16 | LAR RefCoord, R1, start/stop azimuth, R2 | |
| (data) | TIME DURATION * | 4 | Preplanned Time to Video | |
| (data) | TIME DURATION * | 4 | Preplanned Target View Time | |
| (data) | TIME DURATION * | 4 | Time of Flight | |

FIG. 7

INTERFACE BRIDGE FOR INITIALIZING A WEAPON WITH MISSION PLANNING DATA

RELATED APPLICATIONS

This is a divisional application of U.S. application Ser. No. 14/034,347, filed Sep. 23, 2013, entitled "Interface Bridge for Initializing a Weapon with Mission Planning Data" which is incorporated by reference in its entirety herein.

BACKGROUND

Aerial vehicles, such as attack aircraft or fighter aircraft (e.g., Boeing or McDonnell Douglas F/A-18 C/D/E/F Hornet or Lockheed Martin or General Dynamics F-16 Fighting Falcon) or unmanned aerial vehicle (UAV) (e.g., General Atomics MQ-1 Predator or MQ-9 Reaper (Predator-B)) can carry various munitions (e.g., bombs or missiles). The munitions can be carried on carriage racks (e.g., a single carriage or a dual carriage), such as a bomb release unit (BRU) (e.g., Boeing BRU-61/A). Furthermore, aerial vehicles can use a signaling or messaging protocol (e.g., military standard-1760 (MIL-STD-1760)) to control, monitor, and release the munitions on the carriage racks.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure: and, wherein:

FIG. 7 illustrates a diagram of a mission data exchange format (MiDEF) module including three submodules in accordance with an example;

Figure 1:
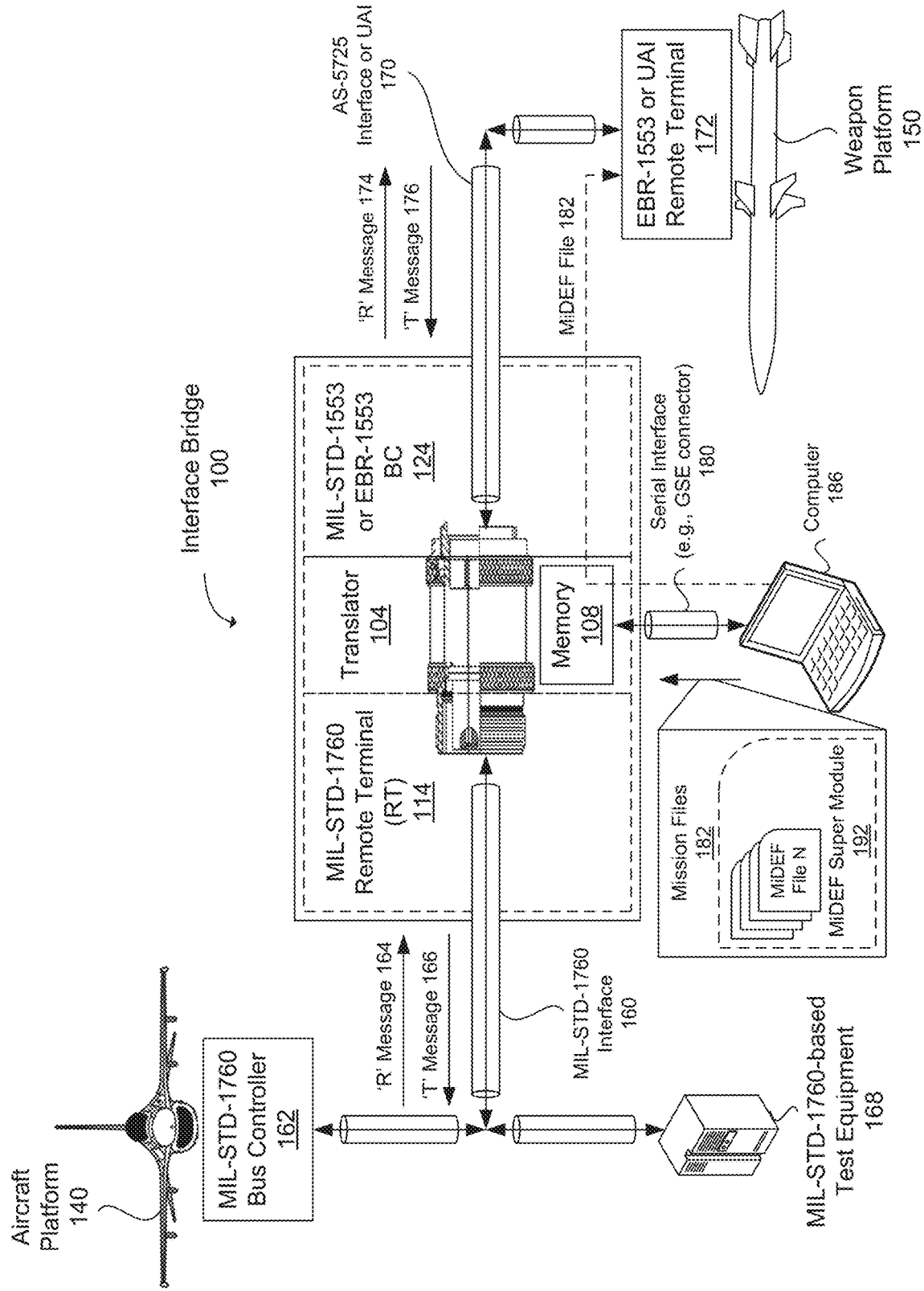
FIG. 1 illustrates a functional diagram of an interface bridge translation between an aircraft platform and a weapon platform in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Miniature munitions (e.g. small diameter bomb (SDB) I (SDB-I) and SDB-II) use Enhanced Bit Rate-1553 (EBR-1553) and/or a Universal Armament Interface (UAI) protocol, which is incompatible with a military standard-1760 (MIL-STD-1760) and/or a MIL-STD-1553B aircraft interface (i.e., legacy interface). These small munitions can mount to a multi-position carriage system, which can provide interface translation, and carriage and/or ejection. In an example, an interface bridge (e.g., MIL-STD-1760 interface bridge) allows interface translation from MIL-STD-1553B to miniature munitions (MM) interfaces (e.g., joint miniature munitions interface (JMMI) and miniature munitions store interface (MMSI)) with a small, self-contained convertor connector, as described in co-pending U.S. patent application Ser. No. 14/034,294, entitled "MILITARY STANDARD (MIL-STD-1760) INTERFACE BRIDGE", filed Sep. 23, 2013, which is hereby incorporated by reference in its entirety. In another example, the interface bridge can provide real-time logical or messaging translation between an aircraft side MIL-STD-1760 precision guided munitions (PGM) message interface (i.e., legacy interface) and a weapon side UAI, as described in co-pending U.S. patent application Ser. No. 14/034,312, entitled "TRANSLATION OF UNIVERSAL ARMAMENT INTERFACE (UAI) TO MILITARY STANDARD (MIL-STD-1760) MESSAGING INTERFACE", filed Sep. 23, 2013, which is hereby incorporated by reference in its entirety.

The MIL-STD-1760 interface bridge can perform the real-time conversion of MIL-STD-1553 protocols to EBR-1553 and UAI protocols and allow weapons utilizing the MMSI or JMMI to interface directly to aircraft platforms utilizing the MIL-STD-1760 interface. However, without major changes (i.e., expensive modifications) to the aircraft and/or weapons platforms and the weapon's associated mission planning system, the weapon may still have no ability to download the mission planned files to allow for the use of advanced weapon capabilities. The types of mission planned files can include: weapon data link (WDL) initialization files, GeoZone (e.g., areas of interest, zones of exclusion, or abort zones), digital terrain elevation data (DTED), imagery files, keying files, or mission and/or targeting data.

As shown in FIG. 1, the technology (e.g., interface bridge 100, methods, computer circuitry, and systems) described herein can provide a mechanism (e.g., software, firmware, and/or hardware) to create and download mission planning files for a UAI weapon (e.g., SDB-II) on a legacy MIL-STD-1760 platform without requiring significant changes to the aircraft avionics software and/or the platform operational flight program (OFP) and mission planning software. The technology can provide capability to load one or more mission planned files 182 from a computer 186 into the non-volatile memory 108 of the interface bridge on the ground through a separate standard serial interface 180, such as Ethernet, universal serial bus (USB), or recommended standard-422 (RS-422)). In an example, the serial interface can use a ground support equipment (GSE) connector coupled to a housing of the interface bridge. In another example, the computer can be coupled to the interface bridge prior to flight (e.g., when the aircraft is on the ground or platform, such as an aircraft carrier). When the weapon 150 and interface bridge are powered on (with aircraft power) the interface bridge can automatically start sending the stored mission planned files to the weapon. The file download message traffic (i.e., mission planned files) can be interspersed seamlessly with the normal aircraft message traffic using the BC 124. In an example, the interface bridge described herein can be incorporated in the MIL-STD-1760 interface bridge described in co-pending U.S. Patent Application entitled "MILITARY STANDARD (MIL-STD-1760) INTERFACE BRIDGE".

The interface bridge can be placed anywhere in a path (i.e., inline) between a MIL-STD-1760 bus controller (BC) 162 of the aircraft platform 140 and the EBR-1553 or UAI remote terminal (RT) 172 of the weapon platform 150. For instance, the interface bridge can be incorporated with controls of the aircraft platform (e.g., in a cockpit) or located with a carriage rack.

As shown in FIG. 1, the technology (e.g., interface bridge 100) described herein can provide management and/or retention of mission planned files in the interface bridge memory 108. The technology can provide real-time retrieval of mission data from memory (e.g., flash) and conversion of a MIL-STD-3014 mission data exchange format (MiDEF) files 182 into MIL-STD-1760 mass data transfer (MDT) format. The technology can provide automatic downloading of the mission files after weapon initialization without aircraft bus controller (BC) 162 interaction. In an example, the download messages can be interspersed with the aircraft/weapon message traffic, so that the integrity of the MiDEF files being downloaded to the weapon can be maintained by avoidance of message collisions with other MDTs being sent by the aircraft bus controller.

The following provides greater details of the examples. FIG. 1 illustrates an interface bridge 100 (e.g., military standard-1760 (MIL-STD-1760) interface bridge) translating between an aircraft platform 140 and a weapon platform 150. The aircraft platform can include a MIL-STD-1760 bus controller (BC) 162 for sending messages (e.g., receive ('R') messages 164) to the weapon and receiving messages (e.g., transmit ('T') messages 166) from the weapon via a MIL-STD-1760 interface 160 (i.e., legacy interface). The weapon platform can operate as an EBR-1553 or UAI remote terminal (RT) 172 for sending messages (e.g., transmit ('T') messages 176) to the aircraft and receiving messages (e.g., receive ('R') messages 174) from the aircraft and via an aircraft store-5725 (AS-5725) interface or UAI 170. The MIL-STD-1760 interface bridge can operate as a MIL-STD-1760 (e.g., MIL-STD-1553) RT 114 for the aircraft platform, include an EBR-1553 or MIL-STD-1553 BC 124 for the weapon platform, and provide a translator 104 for providing physical layer and message layer translation between the MIL-STD-1760 interface and the AS-5725 interface (or UAI).

In another example, the MIL-STD-1760 RT 114 can be coupled to MIL-STD-1760-based test equipment 168 to simulate the aircraft platform's BC and verify the translator and the MIL-STD-1760 RT (and legacy interface) functionality. In another configuration (not shown), the MIL-STD-1553 or EBR-1553 BC can be coupled to EBR-1553-based or MIL-STD-1553-based test equipment to simulate the weapon platform's RT, verify the translator and the EBR-1553 or MIL-STD-1553 BC (and UAI) functionality, and verify the automatic downloading of the mission files 182 to the weapon platform's RT.

The mission files 182 can include multiple MiDEF files. Each MiDEF file can include a capability for a weapon. A MiDEF super module 192 can be a collection of MiDEF files that can include multiple capabilities or all capabilities for the weapon. The memory 108 of the interface bridge 100 can include capabilities and mission files for multiple types of weapons.

Figure 2:
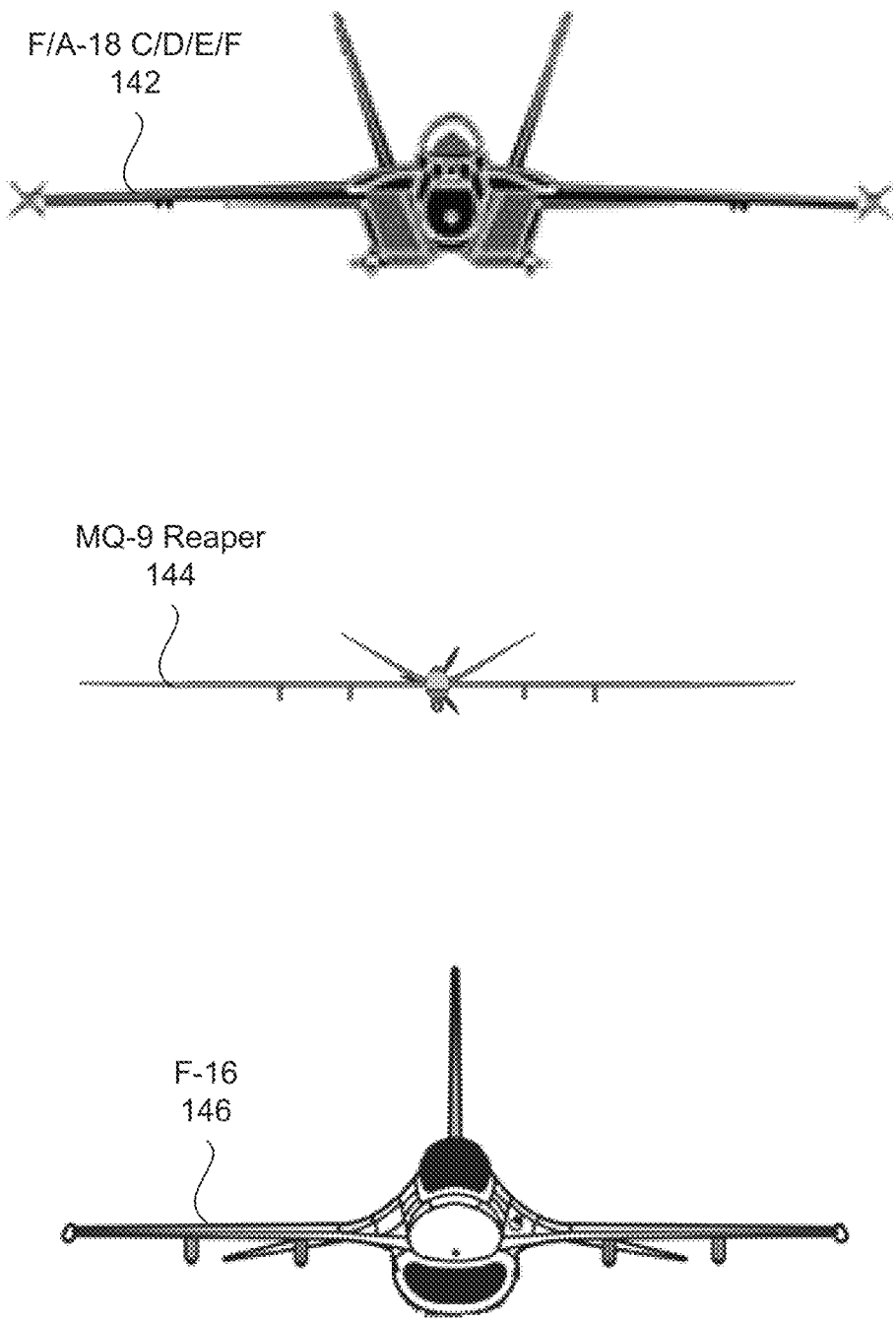
FIG. 2 illustrates a diagram of aircraft platforms in accordance with an example.

FIG. 2 illustrates aerial vehicles, such as attack aircraft or fighter aircraft (e.g., Boeing or McDonnell Douglas F/A-18 C/D/E/F Hornet 142 or Lockheed Martin or General Dynamics F-16 Fighting Falcon 146) or unmanned aerial vehicle (UAV) (e.g., General Atomics MQ-1 Predator or MQ-9 Reaper 144 (Predator-B)) which can be aircraft platforms for the interface bridge.

In computer networking and/or wired communication, different functions can be provided by different layers in a protocol stack. The protocol stack can be an implementation of a computer networking protocol suite. The protocol stack (or protocol suite or standard) can include the definition and implementation of the protocols. Each layer or protocol in the protocol stack can provide a specified function. The modularization of the layers and protocols can make design and evaluation of the computer networking and/or wired communication easier. In an example, each protocol module or layer module in a stack of protocols may communicate with at least two other modules (e.g., a higher layer and a lower layer). The lowest protocol or layer (e.g., physical layer) can provide low-level, physical interaction with the hardware. Each higher layer may add more features. The upper or topmost layers (e.g., application layer) can include user applications.

In an example of aircraft-to-weapon system communication, at least three communication layers can be used, including the physical layer, a message layer, and the application layer. The interface bridge can provide physical layer processing of physical signals between the aircraft platform and a MM or UAI weapon platform and message layer processing of messages between the aircraft platform and the MM or UAI weapon platform.

Prior to the MIL-STD-1553 data bus (i.e., a serial digital multiplex data bus), aircraft platforms and weapons used inefficient and cumbersome analog point-to-point wire bundles as a means of interconnecting the sensors, computers, actuators, indicators, and other equipment onboard the modern military vehicle. The MIL-STD-1553 multiplex data bus can provide integrated, centralized system control and a standard interface for equipment connected to the bus. The MIL-STD-1553 bus (or interface) provides a means by which bus traffic is available to be accessed with a single connection for testing and interfacing with the system. The MIL-STD-1553 (e.g., "Aircraft Internal Time-Division Command/Response Multiplex Data Bus") with the appropriate revision letter (A or B) as a suffix defines operation of a serial data bus that interconnects multiple devices via a twisted, shielded pair of wires. A MIL-STD-1553 system can implement a command-response format. Multiplexing provides weight reduction, simplicity, standardization, and flexibility. Multiplexing facilitates the transmission of information along the data flow, and permits the transmission of several signal sources through one communications system.

A MIL-STD-1553 multiplex data bus system can include a bus controller (BC) controlling multiple remote terminals (RT) connected together by a data bus providing a single data path between the bus controller and the associated remote terminals. One or more bus monitors (BM) may be coupled to the MIL-STD-1553 bus, however, bus monitors may not take part in data transfers, and can be used to capture or record data for analysis. In redundant bus implementations, several data buses are used to provide more than one data path (i.e., dual redundant data bus or tri-redundant data bus). Transmissions onto the data bus can be accessible to the BC and connected RTs.

The MIL-STD-1553 bus is made up of twisted-shielded pairs of wires to maintain message integrity with a redundant pair of buses for a second path (or additional paths) for bus traffic in case one of the buses is damaged. Three functional modes of terminals can be used on the data bus: the bus controller, the bus monitor, and the remote terminal. Devices may be capable of more than one function.

The MIL-STD-1553 bus controller (BC) can be a terminal that initiates information transfers on the data bus. The MIL-STD-1553 can send commands to the remote terminals (RT), which can reply with a response. The MIL-STD-1553 bus can support multiple controllers, but only one BC may be active at a time. The control of information transmission on the bus resides with the bus controller. The MIL-STD-1553 bus monitor (BM), which can be used for instrumentation, can be a terminal assigned the task of receiving bus traffic and extracting selected information to be used at a later time. The MIL-STD-1553 remote terminal can be any terminal operating in the remote terminal (RT) mode (e.g., not operating in either the bus controller or bus monitor mode).

Figure 3:
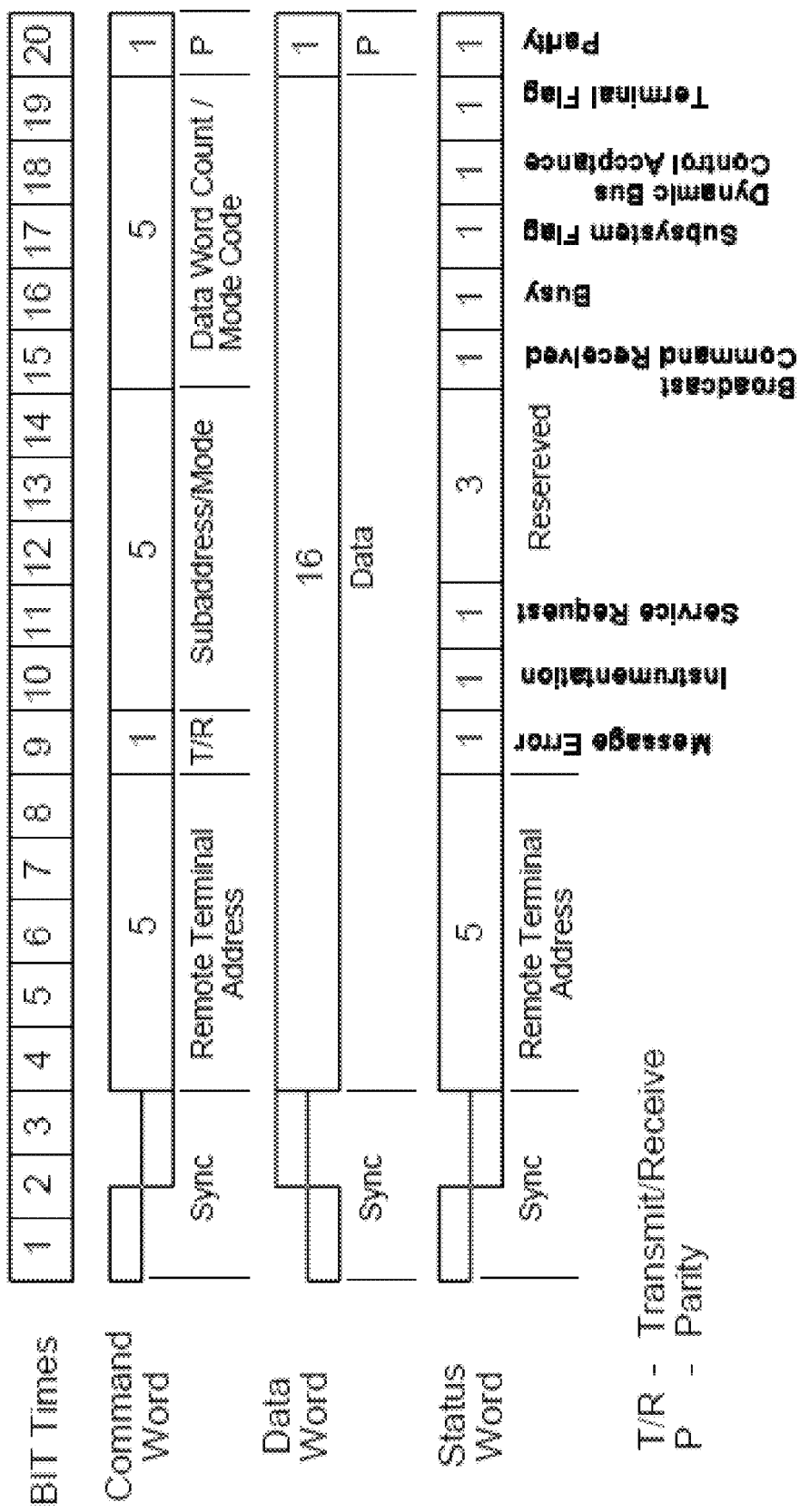
FIG. 3 illustrates a diagram of military standard-1553 (MIL-STD-1553) word formats in accordance with an example.

As illustrated in FIG. 3, messages consist of one or more 16-bit words (e.g., command, data, or status). The 16 bits comprising each word can be transmitted using Manchester code, where each bit is transmitted as a 0.5 μs high and 0.5 μs low for a logical 1 or a low-high sequence for a logical 0. Each word can be preceded by a 3 μs synchronization (sync) pulse (i.e., 1.5 μs low plus 1.5 μs high for data words and the opposite for command and status words, which cannot occur in the Manchester code) and followed by an odd parity bit. Practically each word can be considered as a 20-bit word: 3 bit for sync, 16 bit for payload and 1 bit for odd parity control. The words within a message can transmitted contiguously and a minimum of a 4 microsecond (μs) gap can occur between messages. However, an inter-message gap can be much larger than 4 μs, even up to 1 ms with some older bus controllers. Devices (e.g., RTs) can start transmitting their response to a valid command within 4-12 μs and may considered to not have received a command or message if no response has started within 14 μs.

The nominal word size is 16 bits, with the most significant bit (MSB) first. The three types or formats of MIL-STD-1553 words include a command word, a status word, and a data word, as illustrated by FIG. 3. A packet is defined to have no inter-message gaps. The time between the last word of a controller message and the return (i.e., reply) of the terminal status byte is 4-12 microseconds. The time between status byte and a next bus controller message may be undefined.

Command words are transmitted by the bus controller and include a 3 bit-time sync pattern (i.e., bits 1-3), a 5 bit RT address field (i.e., bits 4-8; RT address 0-31), a 1 transmit/receive (T/R) field (i.e., bit 9; 0 for receive or 1 for transmit), a 5 bit subaddress/mode field (i.e., bits 10-14; indicate the location (sub-address) to hold or get data on the RT (1-30); sub-addresses 0 and 31 are reserved for mode codes), a 5 bit word count/mode code field (i.e., bits 15-19; indicate the number of words to expect (1-32); all zero bits indicate 32 words), and a 1 parity check bit (i.e., bit 20). In the case of a mode code, these bits indicate the mode code number (e.g., initiate self-test and transmit BIT word).

Data words can be transmitted either by the BC or by the RT in response to a BC request. MIL-STD-1553 allows a maximum of 32 data words to be sent in a packet with a command word before a status response is returned. Data words can include a 3 bit-time sync pattern (i.e., bits 1-3; opposite in polarity from command and status words), a 16 bit data field (i.e., bits 4-20), and 1 parity check bit (i.e., bit 20). The status words can be transmitted by the RT in response to command messages from the BC and include a 3 bit-time sync pattern (i.e., a similar pattern as for a command word), a 5 bit address of the responding RT (i.e., bits 4-8; RT address 0-31), a 11 bit status field to notify the BC of the operating condition of the RT and subsystem (i.e., bits 9-19; single bit condition codes, where 'one' state indicates a condition is true; more than one condition may be true at the same time), and 1 parity check bit (i.e., bit 20).

Communication on the MIL-STD-1553 bus can be under the control of the bus controller using commands from the BC to the RTs to receive or transmit. The sequence of words, (the form of the notation can be <originator>.<word_type (destination)> and is a notation similar to communicating sequential processes (CSP)), for transfer of data from the BC (e.g., master) to a terminal (e.g., RT) can be represented by: master.command(terminal)→terminal.status(master)→master.data(terminal)→master.command(terminal)→terminal.status(master)

Thus, during a transfer, communication is started by the bus controller, and a remote terminal device may not initiate a data transfer. The status word at the end of a data transfer sequence ensures that the data has been received and that the result of the data transfer is acceptable. If either RT fails to send its status or the expected data or indicates a problem through the setting of error bits in the status word, the bus controller may retry the transmission. Thus the MIL-STD-1553 sequence of words provides high integrity communication.

The MIL-STD-1553 bus controller can have a schedule of transfers (referred to as cyclic executive schedule structure) that covers the majority of transfers, often organized into a major frame or major cycle, which can be subdivided into minor cycles. While the RTs may not start a transfer directly, the MIL-STD-1553 does provide processes (e.g., acyclic transfers as they are outside the structure used by the cyclic executive) for when an RT needs to transmit data that is not automatically scheduled by the bus controller. Due to acyclic transfers, the bus controller can poll the remote terminals connected to the data bus, generally at least once in a major cycle. RTs with higher-priority functions (for example, RTs operating the aircraft control surfaces) can be polled more frequently, while lower-priority functions may be polled less frequently.

Six types of MIL-STD-1553 transactions can be allowed between the BC and a specific RT or between the bus controller and a pair of RTs. The six types of MIL-STD-1553 transactions can include a controller to RT transfer, a RT to controller transfer, RT to RT transfers, a mode command without a data word, a transmit mode command with data word(s), or a receive mode command with data word(s). In the controller to RT transfer, the bus controller sends one 16-bit receive command word, immediately followed by 1 to 32 16-bit data words. The selected remote terminal can then send a single 16-bit status word. In the RT to controller transfer, the bus controller sends one transmit command word to a remote terminal. The remote terminal then sends a single status word, immediately followed by 1 to 32 words. In the RT to RT transfers, the bus controller sends out one receive command word immediately followed by one transmit command word. The transmitting remote terminal sends a status word immediately followed by 1 to 32 data words. The receiving terminal then sends its status word. In the mode command without a data word, the bus controller sends one command word with a subaddress of 0 or 31 signifying a mode code type command. The remote terminal responds with a status word. In the transmit mode command with data word(s), the bus controller sends one command word with a subaddress of 0 or 31 signifying a mode code type command. The remote terminal responds with a status word immediately followed by a data word. In a receive mode command with data word(s), the bus controller sends one command word with a subaddress of 0 or 31 signifying a mode code type command immediately followed by a data word. The remote terminal responds with a status word. MIL-STD-1553B also allows for additional optional broadcast transfers, such as the controller to RT(s) transfer, the RT to RT(s) transfers, the broadcast type mode command without a data word, and the broadcast type mode command with data word(s).

Figure 4:
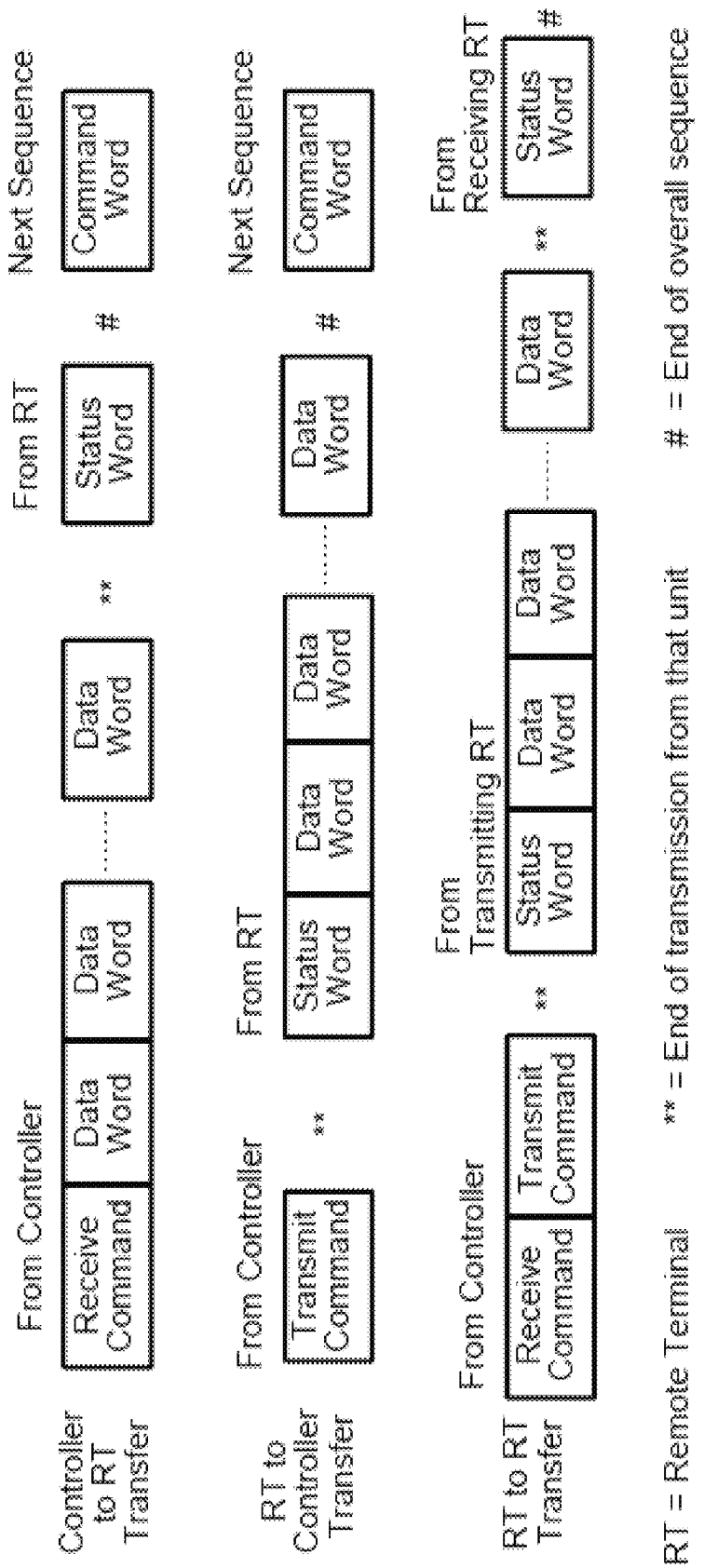
FIG. 4 illustrates a diagram of military standard-1553 (MIL-STD-1553) data message formats in accordance with an example.

FIG. 4 illustrates the basic formats of three basic types of MIL-STD-1553 information transfers including bus controller to remote terminal transfers (BC-to-RT), remote terminal to bus controller transfers (RT-to-BC), and remote terminal to remote terminal (RT-to-RT) transfers. The RT-to-RT transfer may not apply to MIL-STD-1760 weapon systems. The MIL-STD-1553 information transfers can be related to the data flow and can be referred to as messages. In an example, receive ('R') messages can refer to BC-to-RT messages, and transmit ('T') messages can refer to RT-to-BC messages. In another example, receive ('R') messages can refer to computer-to-BC messages, and transmit ('T') messages can refer to BC-to-computer messages.

Mission planning files can be provided on the ground or platform (i.e., not in-flight) with mission planning system software stored on a computer. The mission plan can include the mission data for each of the different types of smart weapons that may be loaded onto the aircraft. The output of the mission planning system software can be written to a portable memory cartridge. Prior to takeoff the pilot or ground crew can insert the mission cartridge into the cartridge reader in the cockpit. The aircraft avionics can read the mission data on the cartridge and parse the mission data into its individual components. Some of these components can be the mission data files for the smart weapons loaded on the aircraft. After takeoff the pilot can power-on the smart weapons so that the smart weapons can be prepared for launch. The aircraft avionics can determine which mission files are for each weapon and proceed to download those files to each of the weapons.

Figure 5:
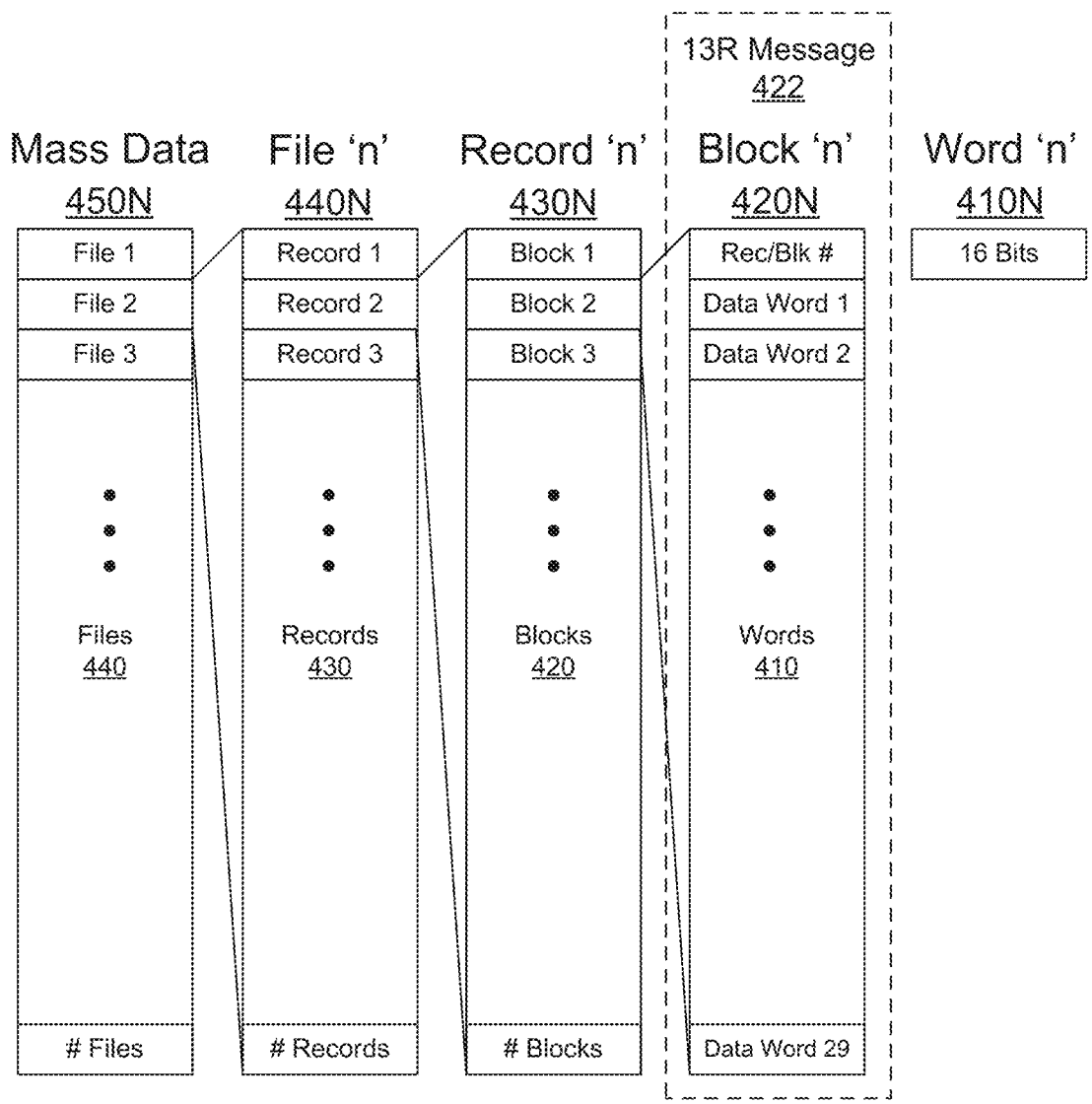
FIG. 5 illustrates a diagram of an file structure for a military standard-1760 (MIL-STD-1760) mass data transfer (MDT) protocol in accordance with an example.

The aircraft can use the MIL-STD-1760 mass data transfer (MDT) protocol to download MDT files to the store over the MIL-STD-1553 or EBR-1553 interface. The MDT protocol can define how the data is physically transferred to an aircraft store by breaking up a file into discrete 13R messages. The MDT protocol may not specify the structure of the data. The MDT protocol can include a transport protocol (e.g., message layer protocol) for transmitting files but may not specify the structure of the file. Each MDT file 440N can be divided into records 430 and each record 430N can include an equal number of blocks 420, as illustrated by FIG. 5. Each block 420N can be transmitted in one 13R message 422 including a header word (e.g., including record number and block number) and 29 data words 410. Each data word 410N can contain 16 bits. The data words can contain the contents of the file. The header word can specify the record number and block number for the data in the file. The mass data (MDT) 450N can include multiple files 440. In an example, the maximum number of files per MDT, records per file, and blocks per record can be 255. In another example, all records may have the same number of blocks. Each block can use a 30 word transfer data message (13R). The record and block numbers (#'s) can appear in the first word with up to 29 words following the header. Unused data word can be set to logic 0.

An aircraft store can include any device intended for internal or external carriage and mounted on aircraft suspension and release equipment, whether or not the item is intended to be separated inflight from the aircraft. Aircraft stores can be classified in two categories: an expendable store and a nonexpendable store. The expendable store may normally be separated from the aircraft in flight such as a missile, rocket, bomb, nuclear weapon, mine, torpedo, pyrotechnic device, sonobuoy, signal underwater sound device, or other similar items. The nonexpendable store may not normally be separated from the aircraft in flight such as a tank (e.g., fuel and spray), line-source disseminator, pod (e.g., refueling, thrust augmentation, gun, electronic attack, data link), multiple rack, target, cargo drop container, drone or other similar items.

Figure 6:
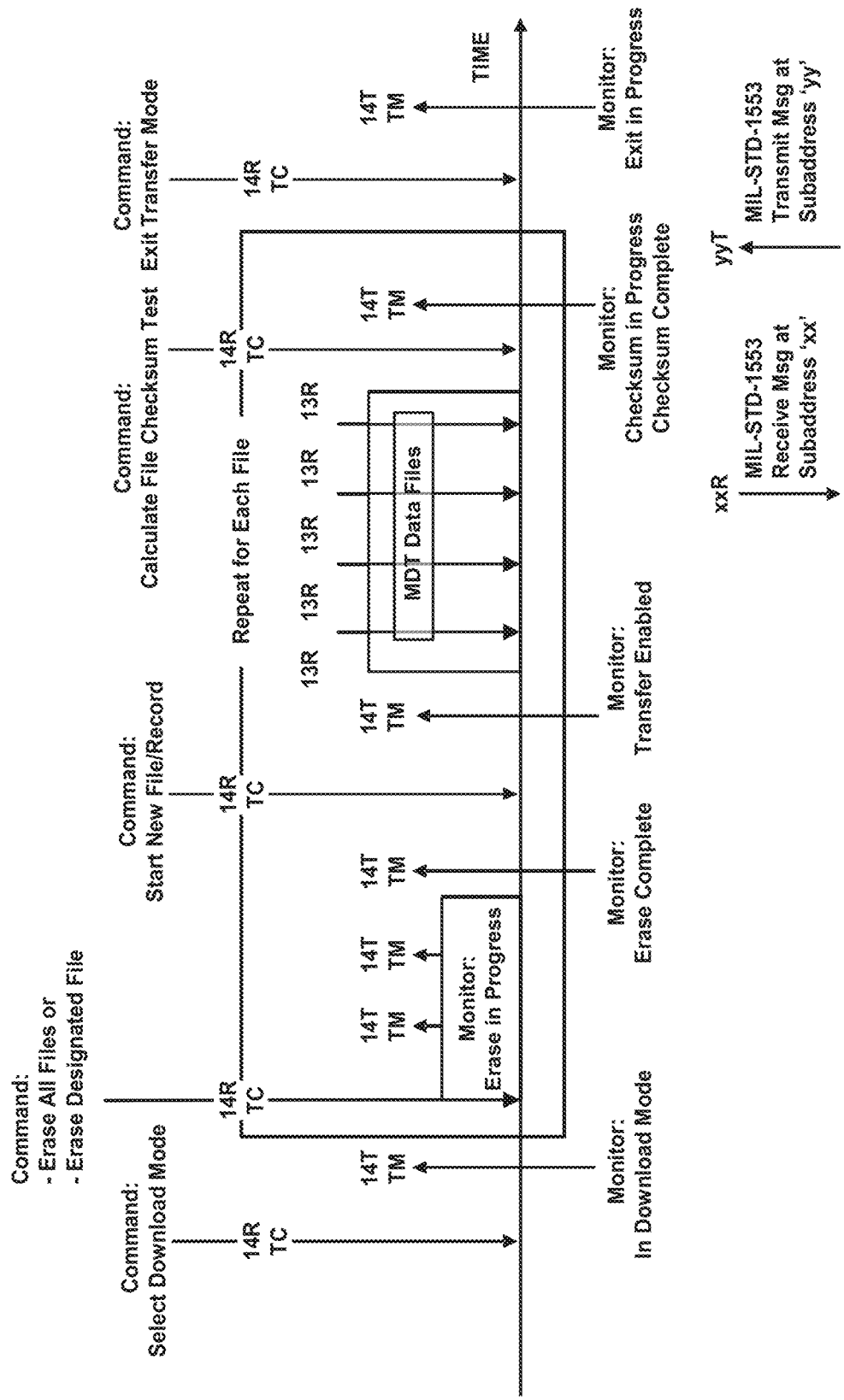
FIG. 6 illustrates a diagram of a military standard-1760 (MIL-STD-1760) mass data transfer (MDT) protocol in accordance with an example.

FIG. 6 illustrates the MDT transport protocol. The 14R transfer control (TC) messages can control the overall transport process by instructing the store (e.g., aircraft store) when a file download is going to start; specifying the file number, number of records, and blocks per record for the file; verifying the file checksum after all the blocks have been transmitted, and commanding the store to exit the transfer mode. The ability to erase all files or a designated file may be another feature of the MDT transport protocol. The MDT process can include 13R (transfer data), 14R (transfer control), and 14T (transfer monitor (TM)) messages, which can be superimposed on other bus traffic that may be occurring. Thus, other non-MDT messages can be interspersed with the MDT message traffic. In an example, the 13R and 14R messages can be provided by the BC and the 14T can be provided by the RT. In another example, only one MDT file download can occur at a time. Thus, multiple MDT files can be downloaded sequentially.

Legacy mission files can have a static data structure, where the location of each of the individual data elements is at a known predetermined location in the file. If the length of the file needs to change because of the addition of a new data element to the file then both the platform (e.g., aircraft platform) and store (e.g., weapon) software is changed. The Universal Armament Interface (UAI) mission files have a dynamic structure in a Mission Data Exchange Format (MiDEF), as defined by MIL-STD-3014. MiDEF is a structure used by the UAI. The architecture of a MiDEF file can be hierarchical or "nested" and dynamic. Each MiDEF file can include at least one module. A module can include a header that can include a table of contents and module data, which can include one or more sub-modules 460, 462, and 464 and/or primitive data elements, as illustrated by FIG. 7. A sub-module can be a self-contained module and can contain data elements and sub-sub-modules. The defined module types and primitive data elements can be defined by MIL-STD-3014. The size of a MiDEF file can be variable as the size can depend upon which elements are included in the modules and sub-modules. If a new data element is required, the aircraft avionics software is not required to be changed with the MiDEF file. The MiDEF can be very flexible but more complex than statically formatted legacy files. Upon receipt of a MiDEF file, the store can parse the file (e.g., mission file) into its component modules and sub-modules before the data can be used to populate an internal mission database.

The structure of MiDEF submodules can be defined in an interface control document (ICD) between a store OFP and a store mission planning module. The individual data elements can be defined in MIL-STD-3014. Also, the functional class code identifier of each module can be specified in MIL-STD-3014. The MiDEF ICD can define the data elements that are members of each module. The first MiDEF module (i.e., top-most MiDEF module) can be downloaded as an individual MDT file. The number of records and blocks per record can be dependent on the length of the first MiDEF module. Other than the last MiDEF module (i.e., bottom-most module) which does not contain any sub-modules, an individual MiDEF module may be any combination of MiDEF modules and individual data elements. If a module has an array of data elements, the module can specify the number of data elements in the contents portion of the module header.

Not all elements that are specified for an individual MiDEF module need to be present. The elements that are selected to be present in the module can reflect the type of mission for which the module was generated. For example, a mission that is not going to use a laser designator may not have the laser code element present in the MiDEF, even though the laser designator element is specified as part of the module in the MiDEF ICD for that store. Additionally, the MiDEF file can be built with the individual elements in any order. The MiDEF file provides greater flexibility and fewer software changes with file changes than the legacy mission files.

The interface bridge can be used to receive MiDEF mission files from a computer or cartridge, store the MiDEF mission files in memory, and download MiDEF mission files to the weapon using a MDT protocol. In an example, the interface bridge can receive MiDEF mission files via the MDT protocol (or other standard serial messaging protocols (e.g., Ethernet, USB, RS-232, RS-422)). The technology describe herein can reduce the cost and development to allow for the use of advanced weapon capabilities on legacy aircraft platforms (e.g., MIL-STD-1760) by downloading MiDEF mission files stored in the interface bridge to the smart weapon via the MDT protocol.

Figure 8:
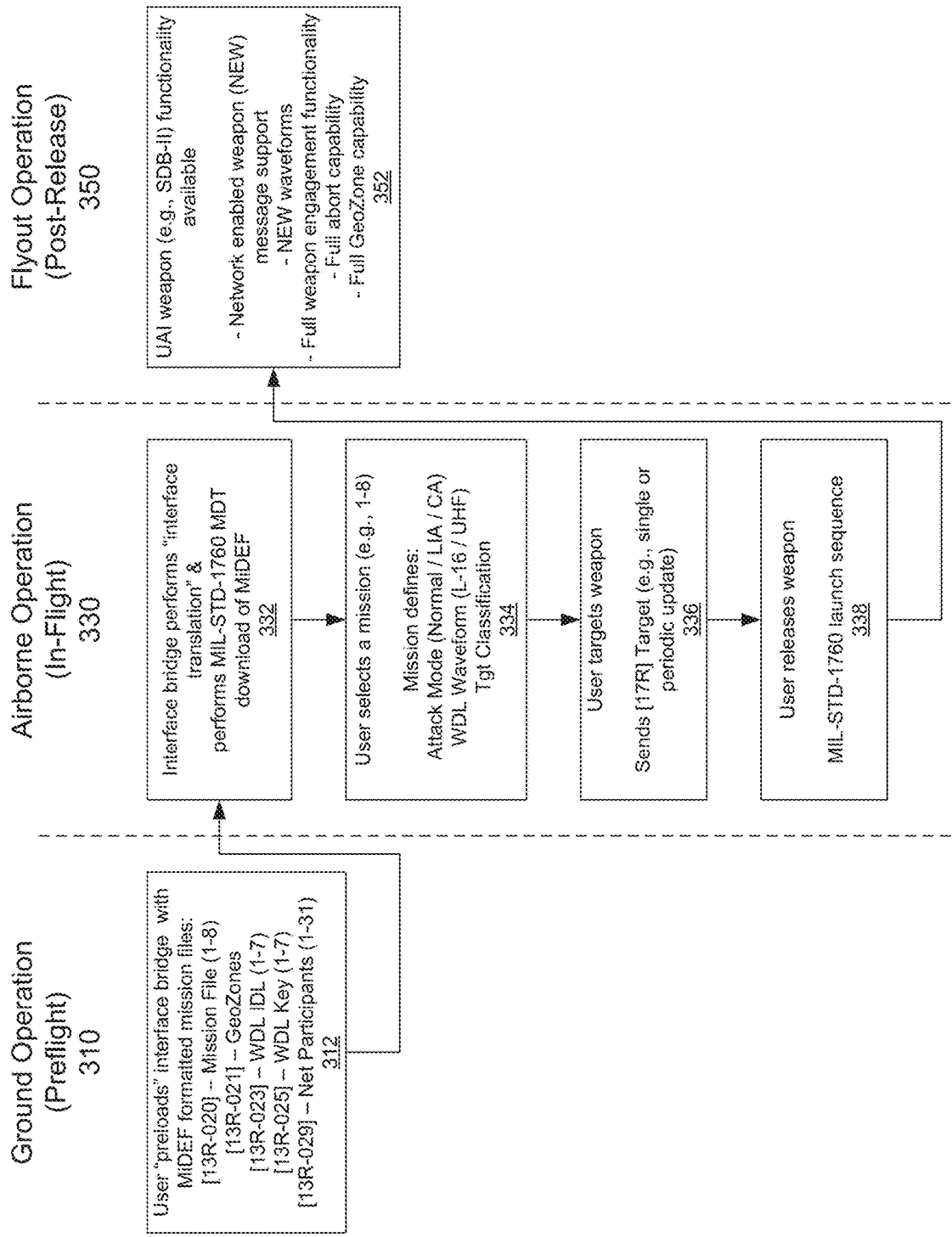
FIG. 8 illustrates a diagram of a mission planning data insertion in ground and flight operations in accordance with an example.

FIG. 8 illustrates an example of the use of mission files in ground (i.e., preflight) 310, airborne (i.e., in-flight) 330, and flyout (i.e., post-release) 350 operations using the interface bridge. In ground operations, a user can preload the interface bridge with MiDEF formatted mission files 312, such as a mission file (1-8) [13R-020], a GeoZone file [13R-021], a weapon data link (WDL) improved data link (IDL) file (1-7) [13R-023], a WDL key file (1-7) [13R-025], or net participants file (1-31) [13R-029].

For instance, a ground support cable can be connected to a ground support equipment (GSE) connector of the interface bridge. The GSE can provide a power input to power the interface bridge and a serial communication interface, such as the Ethernet, USB, or RS-422. In an example, the interface bridge device can be powered by either the 28VDC1 power provided in the MIL-STD-1760 umbilical or by an external power source (i.e., not aircraft power) through the GSE connector and cabling. The interface bridge may be installed on an aircraft or in a standalone configuration in a ground operation. A laptop computer or other portable computing device (e.g., GSE computer) with compatible serial communication interface hardware can be connected to the other end of the serial communication interface line of the cable attached to the interface bridge. The ground support cable and connector can have an interlock signal (e.g., open/ground) signal that allows the interface bridge to sense that the GSE connector is attached to power to power up the interface bridge and run a mission planning file download application. In an example, when power is applied to the interface bridge via the GSE connector, the interface bridge can detect that the GSE cable is attached and can enter a ground mode of operation, where the interface bridge's MIL-STD-1553 remote terminal interface is disabled and/or the interface bridge's MIL-STD-1553 or EBR-1553 bus controller interface is disabled. In another example, an indicator or user command can be used to switch between a ground operation mode and an in-flight operation mode.

The GSE computer application software can implement the MIL-STD-1553 messaging protocol and MIL-STD-1760 mass data transfer (MDT) protocol as the messaging and MDT protocols apply to a MIL-STD-1553 bus controller. The interface bridge can implement the MIL-STD-1553 messaging protocol and MIL-STD-1760 MDT protocol as the messaging and MDT protocols apply to a MIL-STD-1553 remote terminal. In an example, the GSE computer application software can combine the individual binary MiDEF files created by the mission planning application into a single "super-MiDEF" file (i.e., MiDEF super module or super-MiDEF module). The super-MiDEF can conform to the MIL-STD-3014 MiDEF specification, where the individual MiDEF files created by the mission planning software can be sub-modules in the super-MiDEF module. The GSE computer application can initiate transfer of the super-MiDEF file via the MDT protocol. The interface bridge can accept the MDT download and save the file to non-volatile memory (in MiDEF format, i.e., the header word of each 13R can be discarded). Feedback of successful file transfer to the GSE computer can be provided by the checksum results in the 14T message.

In in-flight operation 330, the interface bridge can perform interface translation and perform a MIL-STD-1760 MDT download of MiDEF mission files to the weapon 332. For instance, the interface bridge can be powered by the 28VDC1 power provided in the MIL-STD-1760 umbilical. In an example, the interface bridge can detect that GSE is not connected and can enter a flight mode of operation, where interface bridge enables both MIL-STD-1553 remote terminal and EBR-1553 (or MIL-STD-1553) bus controller communication. In another example, the interface bridge flight mode of operation with an indicator or user command (e.g., presence of a flight mode indicator or absence of a ground mode indicator), where interface bridge enables both the RT and BC communication.

The interface bridge can wait a duration of time (e.g., 30 seconds (sec)) after power application before starting the MDT download of the stored MiDEF mission data files. This time period can provide a window of time for weapon initialization and for the aircraft to download any global positioning system (GPS) MDT files (e.g., almanac, ephemeris, ASSV, and complimentary navigation data) to the weapon through the interface bridge. The interface bridge can retrieve the mission data stored in non-volatile memory and parse mission data into its individual MiDEF module components. After waiting the initial duration of time and if no RT side MDT are in process the interface bridge can sequentially convert each individual MiDEF module into a corresponding MDT file format and download the MDT file to the weapon via the bus controller of the interface bridge. In an example, the interface bridge can also implement the MIL-STD-1760 MDT protocol on the remote terminal side of the interface bridge. In the event the aircraft sends MDT files after the initial duration of time and while the mission data MDTs to the weapon are still in process, the interface bridge can buffer the received MDT file, so that the received MDT file can be downloaded to the weapon at a next available time slot (i.e., between mission MDTs).

After the mission files are download to the weapon, the user can select a mission (e.g., 1-8) 334. The airborne operation user can differ from the ground operation user. The mission can define the attack mode (e.g., normal, laser illuminated attack (LIA), or coordinate attack (CA)), the WDL waveform (e.g., link-16 (L-16) or ultra-high frequency (UHF)), or target (tgt) classification. Link-16 is a military tactical data radio network. The UAI (e.g., SDB-II) weapon can have WDL capability that supports L-16. UHF designates a radio frequency range of electromagnetic waves between 300 megahertz (MHz) and 3 gigahertz (GHz). The UAI (e.g., SDB-II) weapon can have WDL capability that supports the UHF waveform. The UAI (e.g., SDB-II) weapon can have WDL capability that supports mobile satellite system (MSS) datalink operations. The user can target the weapon 336, such as sending a target message [17R] (e.g., single or periodic update). Then, the user can release the weapon (e.g., using a MIL-STD-1760 launch sequence) 338.

In flyout operations 350, the UAI weapon (e.g., SDB-II) functionality may be available 352. The UAI weapon functionality can include network enabled weapon (NEW) message support, NEW waveforms, full weapon engagement functionality, full abort capability, and full GeoZone capability. Flyout can refer to a time after the weapon has released from the aircraft and is guiding towards a target designated prior to release.

Referring back to FIG. 1, a military standard-1760 (MIL-STD-1760) interface bridge 100 can include a housing, a translator device 104, a ground support equipment (GSE) connector (i.e., serial interface 180), and non-volatile memory 108. The housing can include a MIL-STD-1760 connector on a first end and a weapon side connector on a second end. The translator device can translate a MIL-STD-1553 remote terminal (RT) protocol to a weapon side signaling protocol (or UAI messaging protocol) and translate the weapon side signaling protocol (or UAI messaging protocol) to the MIL-STD-1553 RT protocol. The GSE connector can be coupled to the housing and translator device and can be configured for downloading mission planning data for a weapon. The non-volatile memory can be configured to store the mission planning data.

In a configuration, the mission planning data then resident in the non-volatile memory of the bridge device can be downloaded to the weapon automatically during a tactical operation of the interface bridge device. With the downloaded to the weapon, the interface bridge device can provide a method to allow advanced UAI weapon functionality without change to the aircrafts software, (e.g., operational flight program (OFP)).

In an example, the interface bridge can further include a power supply configured to provide power to the translator device and the non-volatile memory during the download of the mission planning data. The power supply can include an energy storage device or a connection to an external power source via the GSE connector or the MIL-STD-1760 connector. In another example, the interface bridge can further include an energy storage device coupled to an operating power of the MIL-STD-1760 connector and configured to provide power to the translator device for a duration after the operating power from the MIL-STD-1760 connector is disconnected.

In another configuration, the GSE connector can includes an Ethernet connector, a universal serial bus (USB) connector, an RS-422 connector, a serial port, or a serial communication interface. The non-volatile memory can include flash memory. In another example, the translator device can include a ground operation mode and an in-flight operation mode. The ground operation mode can be configured to download the mission planning data into the MIL-STD-1760 interface bridge. The in-flight operation mode can be configured to initialize an airborne weapon with the downloaded mission planning data. The translator device can switch to the ground operation mode via a ground mode user command through the GSE connector, and the translator device can switch to the in-flight operation mode when no ground mode user command is applied via the GSE connector or when a flight mode user command is applied via the GSE connector.

In another example, the weapon side connector uses an aircraft store-5725 (AS-5725) connector (e.g., joint miniature munitions interface (JMMI) connector or miniature munitions store interface (MMSI) connector) and the weapon side signaling protocol uses an Enhanced Bit Rate-1553 (EBR-1553) bus controller (BC) protocol. In another configuration, the translator device further includes a MIL-STD-1553 RT protocol module, an EBR-1553 BC protocol module, and a processor. The MIL-STD-1553 RT protocol module can be configured to buffer at least a portion of a signaling from the MIL-STD-1760 connector or control at least a portion of the signaling to the MIL-STD-1760 connector. The EBR-1553 BC protocol module can be configured to buffer at least a portion of a signaling from the AS-5725 connector or control at least a portion of the signaling to the AS-5725 connector. The processor can be configured to translate the MIL-STD-1553 RT protocol to the EBR-1553 BC protocol, and translate the EBR-1553 BC protocol to the MIL-STD-1553 RT protocol. In another example, the translator device further includes translator memory and an arbitration or access logic. The translator memory can be shared between the MIL-STD-1553 RT protocol module and the EBR-1553 BC protocol module. The arbitration or access logic can be configured to provide a prioritization scheme between the MIL-STD-1553 RT protocol module, EBR-1553 BC protocol module, and the processor to access the translator memory without dropping messages.

Figure 9:
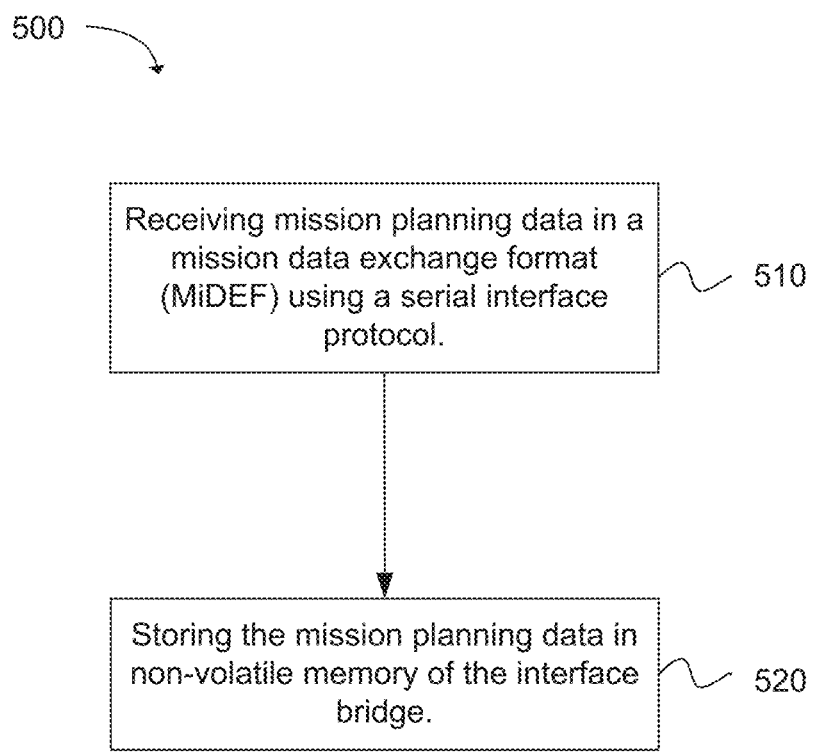
FIG. 9 depicts a flow chart of a method for storing mission planning data for a weapon at an interface bridge in accordance with an example.

Another example provides a method 500 for storing mission planning data for a weapon at an interface bridge, as shown in the flow chart in FIG. 9. The method may be executed as instructions on a machine, computer circuitry, or a processor for the interface bridge, where the instructions are included on at least one computer readable medium or one non-transitory machine readable storage medium. The method includes the operation of receiving mission planning data in a mission data exchange format (MiDEF) using a serial interface protocol (or transport mechanism), as in block 510. The operation of storing the mission planning data in non-volatile memory of the interface bridge follows, as in block 520.

In a configuration, the serial interface protocol (or transport mechanism) can include a military standard-1553 (MIL-STD-1553) messaging protocol and a MIL-STD-1760 mass data transfer (MDT) protocol, a Ethernet protocol, a universal serial bus (USB), a recommended standard-232 (RS-232) protocol, or a RS-422 protocol.

In an example, the operation of receiving mission planning data can further include communicating MiDEF submodules via universal armament interface (UAI) receive messages ('R' messages) and UAI transmit message ('T' message). Data elements for the MiDEF submodules can be defined in MIL-STD-3014. The MiDEF can use a dynamic hierarchical or nested file structure. In another example, the method can further include powering the interface bridge during the storing of mission planning data via an external ground support equipment (GSE) connector on the interface bridge or a MIL-STD-1760 connector on the interface bridge. The mission planning data can include weapon data link (WDL) initialization files, digital terrain elevation data (DTED), imagery files, keying files, mission data, targeting data, or GeoZone data, where the GeoZone data can include areas of interest, zones of exclusion, or abort zones.

In another configuration, the method can further include: switching to an in-flight operation mode when power is provided via a military standard-1760 (MIL-STD-1760) connector on the interface bridge, and no ground operation command is provided; and enabling the interface bridge for enhanced bit rate-1553 (EBR-1553) remote terminal (RT) and EBR-1553 bus controller (BC) communication.

In another example, the method can further include: translating stored mission planning data in a mission data exchange format (MiDEF) into military standard-1760 (MIL-STD-1760) mass data transfer (MDT) file format; and scheduling transmission of the mission planning data to a weapon via a bus controller (BC).

Figure 10:
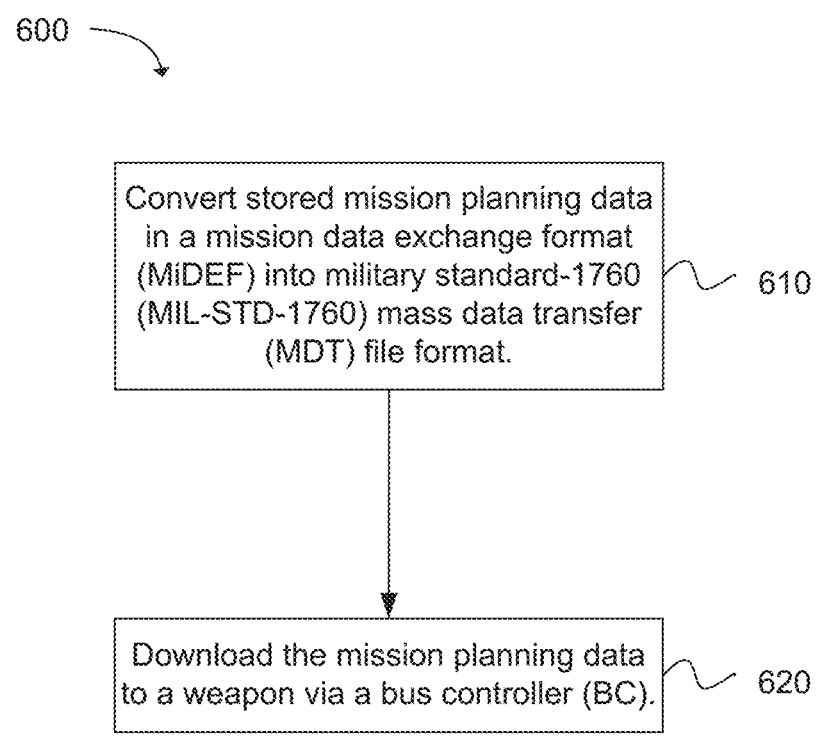
FIG. 10 depicts functionality of computer circuitry of an interface bridge for initializing an airborne weapon with mission planning data in accordance with an example.

Another example provides functionality 600 of computer circuitry of an interface bridge for initializing an airborne weapon with mission planning data, as shown in the flow chart in FIG. 10. The functionality may be implemented as a method or the functionality may be executed as instructions on a machine, where the instructions are included on at least one computer readable medium or one non-transitory machine readable storage medium. The computer circuitry can be configured to convert stored mission planning data in a mission data exchange format (MiDEF) into military standard-1760 (MIL-STD-1760) mass data transfer (MDT) file format, as in block 610. The computer circuitry can be further configured to download the mission planning data to a weapon via a bus controller (BC), as in block 620.

In an example, the computer circuitry configured to convert stored mission planning data in the MiDEF can be further configured to parse the mission planning data into individual MiDEF module components. The mission planning data can be stored in non-volatile memory of the interface bridge. The MIL-STD-1760 MDT file format can include mass data with multiple files, and each of the multiple files can include multiple records, and each of the multiple records can include multiple blocks, and each of the multiple blocks can include multiple 16-bit words.

In another configuration, the computer circuitry can be further configured to: switch to an in-flight operation mode when power for the interface bridge is provided via a military standard-1760 (MIL-STD-1760) connector on the interface bridge, and no ground operation command is provided (via a ground support equipment (GSE) connector, MIL-STD-1760 connector, or weapon side connector); and enable the interface bridge for MIL-STD-1553 remote terminal (RT) communication and enhanced bit rate-1553 (EBR-1553) bus controller (BC) communication. In another example, the computer circuitry configured to download the mission planning data can be further configured to initially delay downloading the mission planning data to the weapon when initial remote terminal (RT) MDTs are in process. The download of the mission planning data can include universal armament interface (UAI) receive messages ('R' messages) and UAI transmit messages ('T' messages).

In another example, the computer circuitry configured to download the mission planning data can be further configured to: intersperse the download of the mission planning data to the weapon with aircraft-to-weapon messaging; or maintain timetag accuracy of timetagged messages. In another configuration, the computer circuitry can be further configured to buffer a remote terminal (RT) MDT and RT messaging during the download of the mission planning data to the weapon. In another example, the computer circuitry can be further configured to: switch to a ground operation mode via ground mode user command (through a ground support equipment (GSE) connector, MIL-STD-1760 connector, or weapon side connector); receive mission planning data in a mission data exchange format (MiDEF) using a military standard-1553 (MIL-STD-1553) messaging protocol and MIL-STD-1760 mass data transfer (MDT) protocol; and save the mission planning data in non-volatile memory of the interface bridge.

Various techniques, or certain aspects or portions thereof, may take the form of program code (i.e., instructions) embodied in tangible media, such as floppy diskettes, compact disc-read-only memory (CD-ROMs), digital versatile disc (DVD), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The interface bridge device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" or "configuration" means that a particular feature, structure, or characteristic described in connection with the example is included in at least one embodiment of the present invention. Thus, appearances of the phrases "in an example" or "in a configuration" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for storing mission planning data for a weapon at an interface bridge, comprising:
    receiving mission planning data in a mission data exchange format (MiDEF) using a serial interface protocol; and
    storing the mission planning data in non-volatile memory of the interface bridge.

2. The method of claim 1, wherein the serial interface protocol includes a military standard-1553 (MIL-STD-1553) messaging protocol and a MIL-STD-1760 mass data transfer (MDT) protocol, a Ethernet protocol, a universal serial bus (USB), a recommended standard-232 (RS-232) protocol, or a RS-422 protocol.

3. The method of claim 1, wherein receiving mission planning data further comprises:
    communicating MiDEF submodules via universal armament interface (UAI) receive messages ('R' messages) and UAI transmit message ('T' message), wherein data elements for the MiDEF submodules are defined in MIL-STD-3014, and wherein the MiDEF uses a dynamic hierarchical or nested file structure.

4. The method of claim 1, further comprising:
    powering the interface bridge during the storing of mission planning data via an external ground support equipment (GSE) connector on the interface bridge or a military standard-1760 (MIL-STD-1760) connector on the interface bridge.

5. The method of claim 1, wherein the mission planning data includes weapon data link (WDL) initialization files, digital terrain elevation data (DTED), imagery files, keying files, mission data, targeting data, or GeoZone data, and wherein the GeoZone data includes areas of interest, zones of exclusion, or abort zones.

6. The method of claim 1, further comprising:
    switching to an in-flight operation mode when power is provided via a military standard-1760 (MIL-STD-1760) connector on the interface bridge, and no ground operation command is provided; and
    enabling the interface bridge for enhanced bit rate-1553 (EBR-1553) remote terminal (RT) and EBR-1553 bus controller (BC) communication.

7. The method of claim 1, further comprising:
translating stored mission planning data in a mission data exchange format (MiDEF) into a military standard-1760 (MIL-STD-1760) mass data transfer (MDT) file format; and
scheduling transmission of the mission planning data to a weapon via a bus controller (BC).

8. At least one non-transitory machine readable storage medium comprising a plurality of instructions adapted to be executed to implement the method of claim 1.

9. An interface bridge for initializing an airborne weapon with mission planning data, the interface bridge having computer circuitry configured to:
convert stored mission planning data in a mission data exchange format (MiDEF) into military standard-1760 (MIL-STD-1760) mass data transfer (MDT) file format; and
download the mission planning data to a weapon via a bus controller (BC).

10. The computer circuitry of claim 9, wherein the computer circuitry configured to convert stored mission planning data in the MiDEF is further configured to:
parse the mission planning data into individual MiDEF module components, wherein the mission planning data is stored in non-volatile memory of the interface bridge, wherein the MIL-STD-1760 MDT file format includes mass data with multiple files, and each of the multiple files includes multiple records, and each of the multiple records includes multiple blocks, and each of the multiple blocks includes multiple 16-bit words.

11. The computer circuitry of claim 9, further configured to:
switch to an in-flight operation mode when power for the interface bridge is provided via a military standard-1760 (MIL-STD-1760) connector on the interface bridge, and no ground support equipment (GSE) connector ground operation command is provided; and
enable the interface bridge for MIL-STD-1553 remote terminal (RT) communication and enhanced bit rate-1553 (EBR-1553) bus controller (BC) communication.

12. The computer circuitry of claim 11, wherein the computer circuitry configured to download the mission planning data is further configured to:
initially delay downloading the mission planning data to the weapon when initial remote terminal (RT) MDTs are in process, wherein the download of the mission planning data includes universal armament interface (UAI) receive messages ('R' messages) and UAI transmit messages ('T' messages).

13. The computer circuitry of claim 11, wherein the computer circuitry configured to download the mission planning data is further configured to:
intersperse the download of the mission planning data to the weapon with aircraft-to-weapon messaging; or
maintain timetag accuracy of timetagged messages.

14. The computer circuitry of claim 11, further configured to:
buffer a remote terminal (RT) MDT and RT messaging during the download of the mission planning data to the weapon.

15. The computer circuitry of claim 9, further configured to:
switch to a ground operation mode via ground mode user command through a ground support equipment (GSE) connector;
receive mission planning data in a mission data exchange format (MiDEF) using a military standard-1553 (MIL-STD-1553) messaging protocol and MIL-STD-1760 mass data transfer (MDT) protocol; and
save the mission planning data in non-volatile memory of the interface bridge.

* * * * *